Nov. 6, 1956  T. M. G. SIMMONS  2,769,411
FUEL COMBUSTION PROCESS AND APPARATUS
Filed Nov. 6, 1951. 2 Sheets—Sheet 1
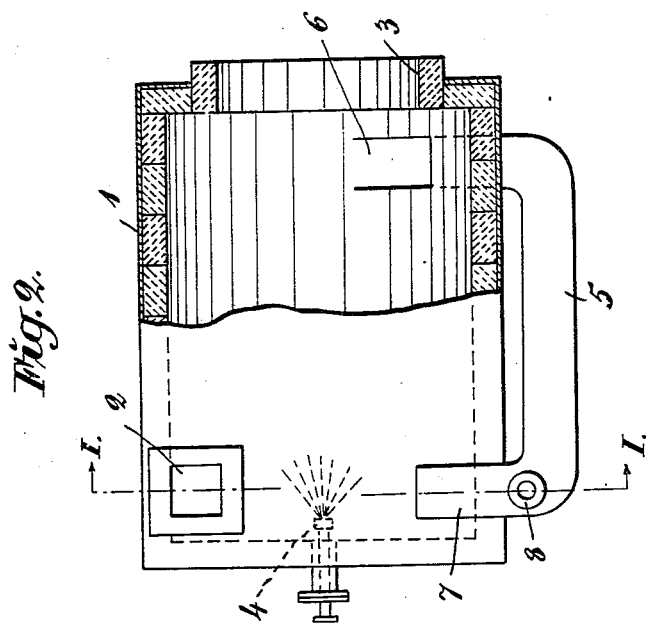
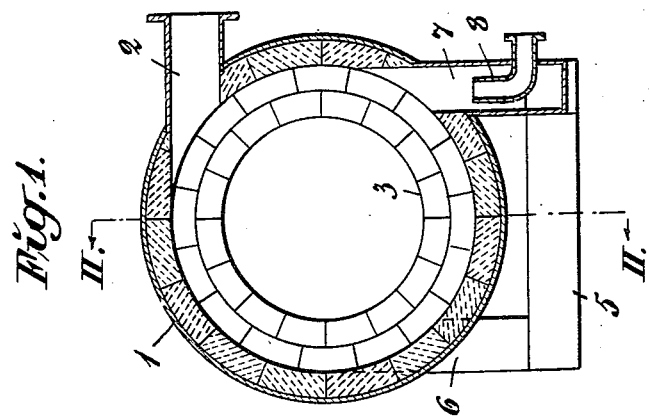
INVENTOR.
TORSTEN MAGNUS GEORG SIMMONS
BY
Campbell Brumbaugh Free & Graves
HIS ATTORNEYS.

Nov. 6, 1956 T. M. G. SIMMONS 2,769,411
FUEL COMBUSTION PROCESS AND APPARATUS
Filed Nov. 6, 1951 2 Sheets-Sheet 2

INVENTOR.
TORSTEN MAGNUS GEORG SIMMONS

BY
Campbell Brumbaugh Free & Graves
HIS ATTORNEYS.

United States Patent Office
2,769,411
Patented Nov. 6, 1956

2,769,411

FUEL COMBUSTION PROCESS AND APPARATUS

Torsten Magnus Georg Simmons, Norrkoping, Sweden, assignor, by mesne assignments, to Rosenblad Corporation, New York, N. Y., a corporation of New York Application November 6, 1951, Serial No. 255,097

2 Claims. (Cl. 110—28)

This invention relates to combustion in a combustion chamber of the so called whirl chamber type having an approximately circular cross section, and in which air and combustion gases containing solid components are caused to stream through the chamber in a helical path along the interior surface of the chamber in the direction towards a main exhaust through which said gases are discharged so as to heat the heating surfaces of a boiler for instance. Conditions of this kind arise in the combustion of fuel introduced into the combustion chamber in the form of powder or lumps, but can also arise if a hydrous liquid fuel, for instance waste sulphite lye evaporated to contain 50–60% of dry substances, is injected into the chamber in the form of a spray or drops. The drops will then be ignited only after having dried to powder, whereupon the combustion process will take place in the same way, as if the fuel had been initially introduced into the chamber in such a pulverized form, so that the combustion of the dried particles will proceed while they are being carried on by the whirl of air and gases. As far as possible losses of particles of fuel through the main exhaust should be prevented. Especially when burning fuels having large contents of ashes it is also important to prevent that large quantities of ashes proceed that way and form coatings on the heating surfaces thus necessitating frequent cleaning of said surfaces.

The main object of the invention is to remove continuously such solid substances from the combustion chamber, before being discharged through the main exhaust.

A further object of the invention is to utilize to this purpose the characteristic feature of the aforesaid type of combustion chamber, namely that owing to the influence of the centrifugal force the layer of the combustion gas whirl moving adjacent to the interior wall surface of the chamber will be enriched or concentrated in solid components.

Still a further object of the invention is to remove or discharge combustion gases enriched or concentrated in or mixed with solid components from a part of the interior cylindrical wall surface of the chamber at a point in the vicinity of and—viewed in the direction of flow of the gas whirl—before the main exhaust.

A further object of the invention is to treat the gas thus discharged in any of the following alternative ways:

1. The gas together with its contents of solid components is conducted back to a part of the combustion chamber which—viewed in the flowing direction of the combustion gas through the chamber—is situated before that part from which the gas is discharged. This process is particularly suitable to be used in the case when the solid components, to a substantial extent at least, consist of particles of fuel not completely burnt. In this way I gain the advantage that said particles are forced again to pass through the chamber and then will be subjected to complete and final combustion.

2. The gas together with its contents of solid compounds is caused to pass through a separator, for instance of the cyclone type, in which said solid particles are separated from the gas and continually or periodically removed from the system, while the gas thus purified from the said components is discharged from the separator and can be utilized for some purpose, for instance heating. Alternatively the purified gas can heat the same contrivance as that heated by means of the gases passing through the main exhaust. This method is especially suitable for use when burning fuel concentrated in ashes, for instance waste sulphite lye. At the same time the ashes are removed from the system.

3. The gas purified from solid components, preferably in the same way as in the case 2, is returned to the combustion chamber at a part thereof located at least in the vicinity of the place, at which the fuel was initially introduced. This method is particularly suitable to be used at firing with hydrous fuel rich in ashes, for instance waste sulphite lye so as to effect a high temperature in the drying zone of the combustion chamber at the same time as separation of ashes is effected.

Some embodiments of the invention are shown diagrammatically in the accompanying drawings, in which Fig. 1 is a cross-section of an arrangement according to the invention on the line I—I of Fig. 2.

Fig. 2 is a side view of the same arrangement on the line II—II of Fig. 1, some parts being sectioned.

Figure 6:
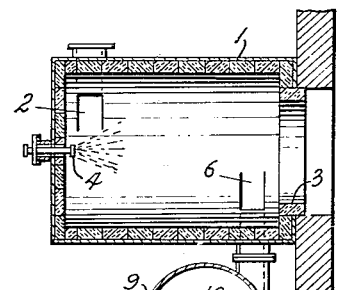
Fig. 6 is a view in transverse section taken on the line 6—6 of Fig. 5.
Figure 3:
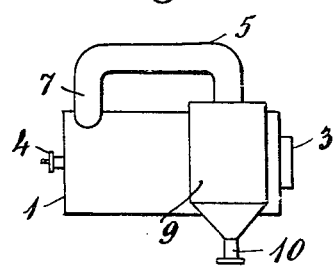
Fig. 3 shows a side view of a modified arrangement on a smaller scale.
Figure 4:
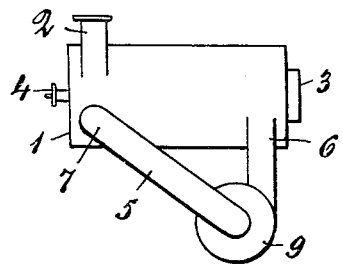
Fig. 4 is a plan view of the same modification.
Figure 5:
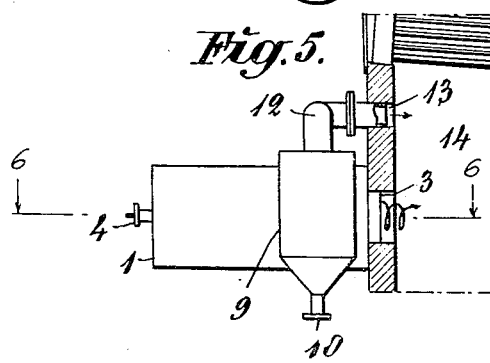
Fig. 5 is a side view of still another modification connected to the fire place of a boiler.

Figures 1 and 2 are intended to illustrate the alternative case 1 aforesaid, while Figures 3 and 4 illustrate case 2 and Fig. 5 case 3.

As will appear from Figures 1 and 2 the approximately cylindrical combustion chamber 1 is of the whirl chamber type and has one or more inlets 2 for introducing combustion air tangentially to its interior cylindrical wall surface, and one or more main exhausts 3 for the discharge of combustion gases preferably in axial direction, the main exhaust or exhausts having a cross sectional area, as shown in the drawings, which is restricted in relation to the cross sectional area of the adjacent part of the combustion chamber. The fuel which can consist of evaporated sulphite lye but also of a fluid sulphite lye, for instance, is injected into the combustion chamber in an atomized state through one or more atomizers 4. A duct 5 is arranged to connect a preferably tangential outlet 6 from the chamber in the vicinity of the main exhaust 3 with an inlet 7 to the chamber also preferably tangential. Viewed in the axial direction of the chamber said inlet 7 is situated farther away from the exhaust 3 than the outlet 6. A tube 8 for gas, air or steam can open into the inlet 7 or at some other point of the duct 5.

During the operation the combustion air together with the combustion gases generated will flow on a helical path through the chamber from the inlet 2 to the main exhaust 3. The whirl of gases establishes a certain pressure effect at the outlet 6, and a relative sucking effect at the inlet 7, so that the combustion gases enriched in solid particles will be sucked through the duct 5 from the outlet 6 into the chamber at the inlet 7. This sucking effect can be intensified by means of a flow of gas, steam, or air, which at a relatively great speed is blown into the inlet 7 through the tube 8. The liquid fuel injected in the form of drops or a spray through the nozzle 4 is dried in the chamber 1 so as to form grains or a powder under the influence of the heat radiated from the walls of the chamber and from the burning particles of fuel. These particles in the form of grains or powder are caught by the air-gas whirl, ignited, and burnt in the state of grains or powder. Under the influence of the centrifugal force the particles are carried in the direction towards the interior cylindrical surface of the chamber and the particles which have not been burnt before they reach said cylindrical surface will be carried on by the air-gas stream, and move in helical paths along the cylindrical surface towards the main exhaust 3 under continued combustion. At least a considerable part of the particles, which have not been completely burnt at their arrival at the outlet 6, are discharged therethrough and returned by the combustion gases through the duct 5 to the inlet 7 so as to be subjected to complete combustion during their renewed passage through the chamber 1. Preferably, the inlet 7 opens in or at the part, where the new fuel just introduced into the chamber 1 is caused to dry and/or be ignited. The duct 5 can be built in or enclosed into the wall of the chamber 1, if desired, and a pump can be arranged instead of the tube 8.

According to Figures 3 and 4 the gases concentrated or enriched in solid components are conducted from the tangential outlet 6 to a cyclone 9 or some other separator, in which the solid components are separated from the gases, and carried away from the system through a bottom outlet 10, while the gases purified from said components are returned through the duct 5 to a place in the combustion chamber nearer to the fuel nozzle 4 than to the outlet 6. In that way also the particles carried away through the outlet 6 are separated through the cyclone 9.

Fig. 5 diagrammatically shows an embodiment according to which the combustion gases concentrated or enriched in solid particles and escaping through the outlet 6 (not shown) after separation in the cyclone 9 are discharged through a tube 12, which preferably opens into an inlet 13 in the same fire place 14 (for instance a boiler) as the main exhaust 3 from the chamber 1, so that the contents of heat of all combustion gases generated in the chamber will be utilized in said fire place. This is also the case in the embodiments according to Figures 1–4, though in these cases the gases discharged through the outlet 6 first are returned. However, the tube 12 can alternatively also be connected to some other contrivance for the utilization of the heat of the gases.

According to an alternative embodiment two or more return ducts 5 can be arranged, for instance if the combustion chamber is provided with means for the introduction of fuel in its middle part between the ends each of which has a main exhaust. Each duct will then return the gas enriched in solid particles from a place in the vicinity of the end part to a place nearer to the injection means of fuel. If on the other hand the main exhaust is arranged at the middle part of the chamber and the introduction of fuel at each end, each of the two return ducts will be arranged to return the gas enriched in solid particles from a place in the vicinity of the middle part to a place nearer to the injecting means of fuel at the ends.

The invention is not restricted to the particular embodiments now described which are to be regarded as being illustrative but not limiting.

What I claim is:

1. In a combustion process for using fuel which yields solid components of combustion, the steps of passing the fuel and air into one end of a whirl type combustion chamber having an axial main exhaust at its other end, causing the fuel to ignite and the ignited fuel, air and combustion products to flow in a helical path toward the main exhaust, thereby causing the peripheral layer of gas nearest the interior surface of the chamber to become enriched, under the influence of centrifugal force, with solid components, tangentially withdrawing the enriched gases from the periphery of the helical flow path in the vicinity of and in advance of the main exhaust, separating the solid components from the withdrawn enriched gases externally of the combustion chamber for removal from the combustion process, and passing the remaining combustion gases in the combustion chamber through the main exhaust for heating purposes, and passing the gases from which the solids components have been separated into the same heat consuming contrivance.

2. An arrangement for the combustion of fuel resulting in solid components of combustion, comprising in combination an elongated combustion chamber of the whirl type having at least one restricted main exhaust for combustion gases at one end, means defining at least one tangential subsidiary outlet at the interior wall of the chamber in the vicinity of the restricted main exhaust for gases enriched in solid fuel components due to centrifugal force, means for injecting the fuel and air at the opposite end of the chamber to cause gases and solid components to stream through the chamber in a helical path along the interior wall of the chamber to said subsidiary outlet and the main exhaust, a separator outside the furnace for separating solid components from the gases enriched thereby, a duct connection between the subsidiary outlet and the separator for conducting the gases enriched with solid components to the separator, and a discharge outlet from the separator for said gases from which the solid components have been extracted, first means to connect the discharge outlet of the separator to a heat consuming contrivance and second means to connect the main exhaust of the furnace to the heat consuming contrivance.

References Cited in the file of this patent

UNITED STATES PATENTS

| | | |
|---|---|---|
| 1,427,176 | Taylor | Aug. 29, 1922 |
| 1,618,808 | Burg | Feb. 22, 1927 |
| 2,465,464 | Meyer | Mar. 29, 1949 |

FOREIGN PATENTS

| | | |
|---|---|---|
| 915,838 | France | July 29, 1946 |